(12) United States Patent
Holland et al.

(10) Patent No.: US 8,645,034 B2
(45) Date of Patent: Feb. 4, 2014

(54) METHOD OF ALIGNING A TRANSMISSION SYNCHRONIZER

(71) Applicant: Ford Global Technologies, LLC, Dearborn, MI (US)

(72) Inventors: Shawn Adam Holland, Westland, MI (US); Jeffrey James Tumavitch, Livonia, MI (US); Steve Craig Meisner, Dexter, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/772,328

(22) Filed: Feb. 21, 2013

(65) Prior Publication Data
US 2013/0166160 A1 Jun. 27, 2013

Related U.S. Application Data

(63) Continuation of application No. 12/748,516, filed on Mar. 29, 2010, now Pat. No. 8,406,974.

(51) Int. Cl.
*G06F 19/00* (2011.01)
(52) U.S. Cl.
USPC .................................. 701/58; 701/60; 701/68

(58) Field of Classification Search
USPC ................. 701/58, 51, 55, 56, 60, 64, 67, 68; 192/3.51–3.63
See application file for complete search history.

(56) References Cited

U.S. PATENT DOCUMENTS

| | | | |
|---|---|---|---|
| 6,083,138 A | 7/2000 | Aoyama | |
| 6,319,168 B1 | 11/2001 | Morris | |
| 6,769,523 B2 | 8/2004 | Muetzel | |
| 7,377,374 B2 | 5/2008 | Buchhold | |
| 7,945,366 B2 * | 5/2011 | Bartels et al. | 701/67 |
| 8,406,974 B2 * | 3/2013 | Holland et al. | 701/58 |
| 2004/0118652 A1 | 6/2004 | Muetzel | |
| 2008/0065300 A1 | 3/2008 | Petzold | |
| 2008/0109143 A1 * | 5/2008 | Bartels et al. | 701/67 |
| 2008/0314176 A1 | 12/2008 | Krieger | |
| 2009/0071277 A1 | 3/2009 | Bader | |
| 2009/0107270 A1 | 4/2009 | Krieger | |

* cited by examiner

*Primary Examiner* — Richard Camby
(74) *Attorney, Agent, or Firm* — James Dottavio; MacMillan, Sobanski & Todd, LLC

(57) ABSTRACT

A method of detecting synchronizer misalignment in a vehicle transmission, includes: applying an engagement force to an input side of a synchronizer or output side of the synchronizer; monitoring a performance characteristic of a power source configured to apply the engagement force; and determining a misalignment based on the performance characteristic exceeding or not achieving a predetermined threshold.

2 Claims, 6 Drawing Sheets

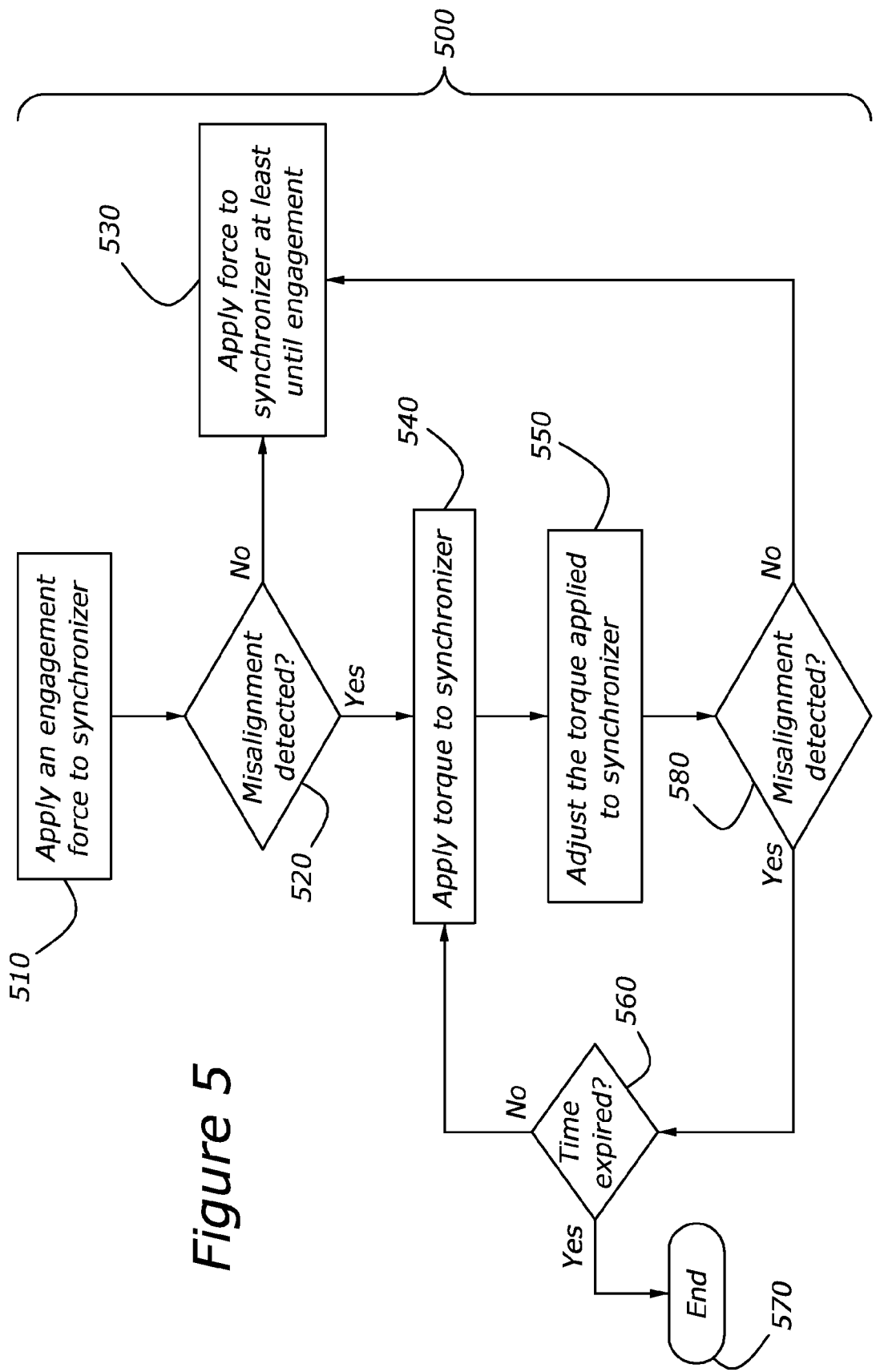

METHOD OF ALIGNING A TRANSMISSION SYNCHRONIZER

CROSS-REFERENCE TO RELATED APPLICATIONS

This application is a divisional and claims the benefit of U.S. patent application Ser. No. 12/748,516, filed Mar. 28, 2010, which has issued as U.S. Pat. No. 8,406,974.

TECHNICAL FIELD

The present disclosure relates to vehicle transmission synchronizers, methods of detecting misalignment and methods of aligning the same.

BACKGROUND

Conventional vehicle transmissions include one or more synchronizers that selectively link two transmission components. The synchronizer includes a driving side and a driven side, each with mating teeth formed on their respective engaging surfaces. During synchronizer engagement in some transmissions there is a chance that the synchronizer teeth will get misaligned or "stacked" on the teeth of the clutch body. This is undesirable as it can cause unnecessary wear on synchronizer teeth and additional time to—in some instances—back out of the synchronizing mode and re-start the process.

Some existing transmissions have sought to rectify tooth-on-tooth engagement by adjusting a clutch. For example, U.S. Patent Publication No. 2008/0109143 titled "Motor Vehicle Transmission Control for Operating a Motor Vehicle Transmission" discloses adjusting a clutch to a desired position in response to a shift fork position. Misalignment is detected based on a signal indicating that the shift fork has not reached a desired position/value. Paragraph [0029]. This method of detection, however, produces more wear in transmission components as it requires an axial force be applied to the shift fork for some excessive period of time before it is recognized that the fork is essentially stuck due to a misalignment. A more expeditious detection method is desirable to reduce the wear on transmission components and provide an overall quicker solution to the problem.

Therefore, it is desirable to have a method of aligning a transmission synchronizer that efficiently detects and cures misalignment without the need for additional transmission components or repetitive attempts to back out and re-engage the synchronizer.

SUMMARY

The present invention may address one or more of the above-mentioned issues. Other features and/or advantages may become apparent from the description which follows.

One embodiment of the present invention involves a method of detecting synchronizer misalignment in a vehicle transmission, the method including: applying an engagement force to an input side of a synchronizer or output side of the synchronizer; monitoring a performance characteristic of a power source configured to apply the engagement force; and determining a misalignment based on the performance characteristic exceeding or not achieving a predetermined threshold.

In another exemplary embodiment of the present invention a vehicle transmission, includes: an input shaft; an output shaft; a synchronizer assembly including a first side connected to the input shaft and second side connected to the output shaft; a control module configured to detect teeth misalignment between the first side and second side of the synchronizer assembly; a first power source linked to the control module; a shift fork configured to apply the engagement force to the first side or second side; a second power source connected to the clutch drum and control module. The control module is configured to control movement of the shift fork. The control module is configured to detect misalignment in the synchronizer assembly through monitoring a performance characteristic of the second power source. The control module is configured to instruct the first power source to rotate the first side or second side of the synchronizer assembly when misalignment is detected.

Another exemplary embodiment of the present invention includes a control circuit for a vehicle transmission, having a control module configured to govern synchronization between an input shaft and output shaft. The control module includes a processor circuit configured to monitor a performance characteristic of a power source and detect a misalignment between synchronizer components based on the performance characteristic. The control module is linked to a power source and configured to instruct the power source to rotate the input or output side of a synchronizer when a misalignment has been detected.

One advantage of the present teachings is that the methods and transmission components efficiently detect and cure misalignment without repetitive attempts to back out and re-engage the synchronizer. The present teachings are beneficial in that they yield more consistent engagement time and feel.

Another advantage of the present teachings is that the methods of detecting misalignment and methods of aligning can be implemented through software changes and or updates into the transmission control unit. Existing transmission architecture can be utilized to effectuate some of the exemplary methods, thereby significantly reducing the cost of their implementation.

An additional benefit to the present teachings is that they reduce wear and degradation of transmission components thus increasing the overall durability of the transmission.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

BRIEF DESCRIPTION OF THE DRAWINGS

FIG. 5 is a flow chart illustrating a method of aligning a transmission synchronizer.

Figure 1:
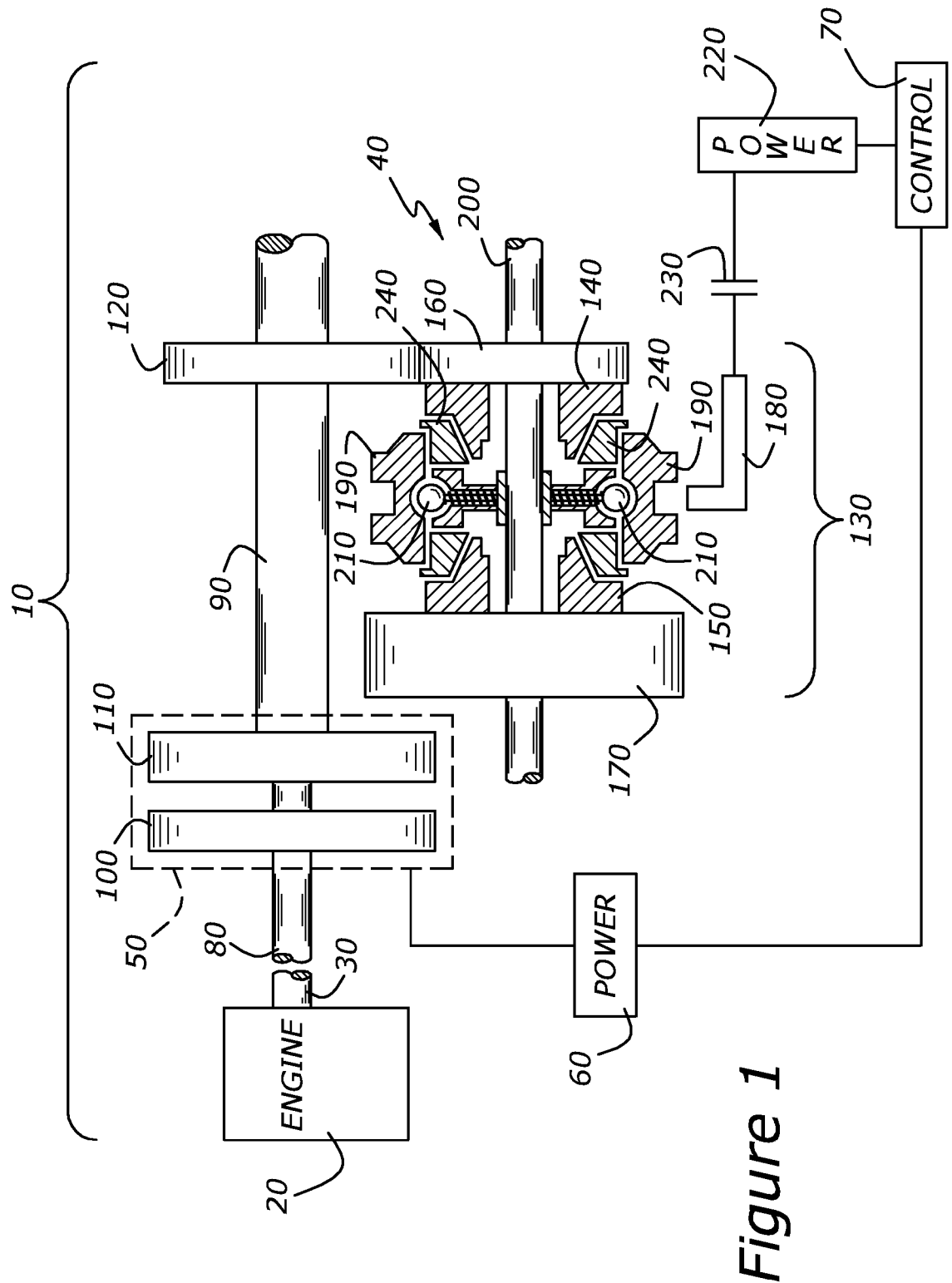
FIG. 1 is a schematic depiction of a vehicle powertrain compatible with an exemplary embodiment of the present invention.
Figure 6:
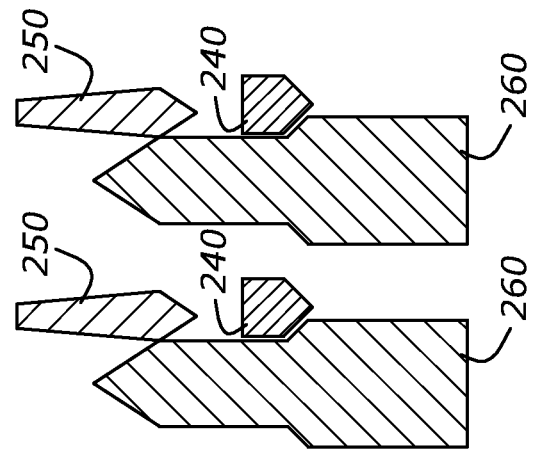
FIG. 6 is a side view of the transmission synchronizer of FIG. 1 in an aligned condition.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-7, there is shown therein a vehicle transmission and related components for detecting synchronizer misalignment and aligning the synchronizer. Various transmissions are compatible with the present teachings; the transmission can be any conventional transmission such as, for example, an automatic, manual, continuously variable or electrically variable transmission. Discussed are various methods for detecting misalignment between two or more components in a transmission synchronizer. Where misalignment is detected a transmission control unit is configured to implement a method of aligning the synchronizer by applying a predetermined torque to at least one side of the synchronizer, effectively rotating the torque side of the synchronizer. When a teeth-on-teeth even occurs a small amount of clutch torque is applied to spin the input shaft moving the gear teeth allowing the engagement to finish. The torque is applied while a shift fork is actuated to bring the synchronizer into engagement. The force control position phase is maintained throughout clutching. In this manner, repetitive attempts at alignment—i.e., through backing out and re-engaging—are avoided. The disclosed methods can be implemented at zero speed conditions or when both sides of the synchronizer components are in motion.

Referring now to FIG. 1, there is shown therein a schematic depiction of an exemplary vehicle powertrain 10 compatible with the disclosed methods. The powertrain 10 includes an engine 20 which, through a crankshaft 30, supplies power to the illustrated transmission 40. The exemplary transmission 40 partially shown in FIG. 1 is a dual clutch, automatically shifting manual transmission. The transmission 40 includes a dual clutch pack 50 that can receive a predetermined amount of torque through the engine 20 or through a secondary power source 60. Secondary power source 60 can be, for example, a motor or fluid pump. Secondary power source 60 is linked to a battery or fluid reservoir (not shown) through a control module 70. Control module 70 is configured to govern the power source 60. The dual clutch pack 50 is configured to selectively engage two concentrically arranged input shafts 80, 90. A gear 100 (or gear set) is attached to the input shaft 80 and configured to engage other transmission components to yield a predetermined drive ratio. The outermost input shaft 90 is journaled onto input shaft 80 and rotates with respect to input shaft 80. Input shaft 90 (as partially shown) includes two gears 110, 120 (or gear sets) also configured to engage other transmission components for a predetermined drive ratio. Gear 120 engages a synchronizer assembly 130, as shown in FIG. 1.

The synchronizer assembly 130, shown in FIG. 1, is configured to rotatably link two transmission components—in this case an input side of the transmission synchronizer 140 and an output side 150. The input side 140 of the synchronizer includes a gear 160 configured to engage gear 120 of input shaft 90. As such, input side 140 of the synchronizer assembly 130 is configured to rotate input shaft 90. An output side 150 of the synchronizer assembly 130 is linked to a gear 170 that is connected to an output shaft. The two shafts and are selectively linked by the synchronizer assembly 130.

A shift fork 180, as illustrated in FIG. 1, is configured to apply an engagement force to a spring mounted clutch body 190 journaled onto shaft 200 thorough a ball bearing assembly 210. Shift fork 180 is selectively linked to a power source 220 in the transmission 40. Power source 220 can be, for example, a motor or hydraulic pump linked to a battery or fluid reservoir through the control module 70. A clutch drum 230 connects shift fork 180 and power source 220. When the clutch drum 230 is applied, shift fork 180 is moved to engage clutch body 190.

The control module 70, as shown in FIG. 1, is linked to power source 220 and configured to govern application of the clutch drum 230 and the shift fork 180.

As pressure is applied to clutch body 190 the teeth on an inner surface of clutch body are configured to engage an intermediate ring 240 (or what is commonly referred to as a "blocker") and teeth on both the input and output sides of the synchronizer assembly 140 and 150, respectively. The rotational speeds of the input side and output side of the assembly 140 and 150 are then synchronized.

Figure 2:
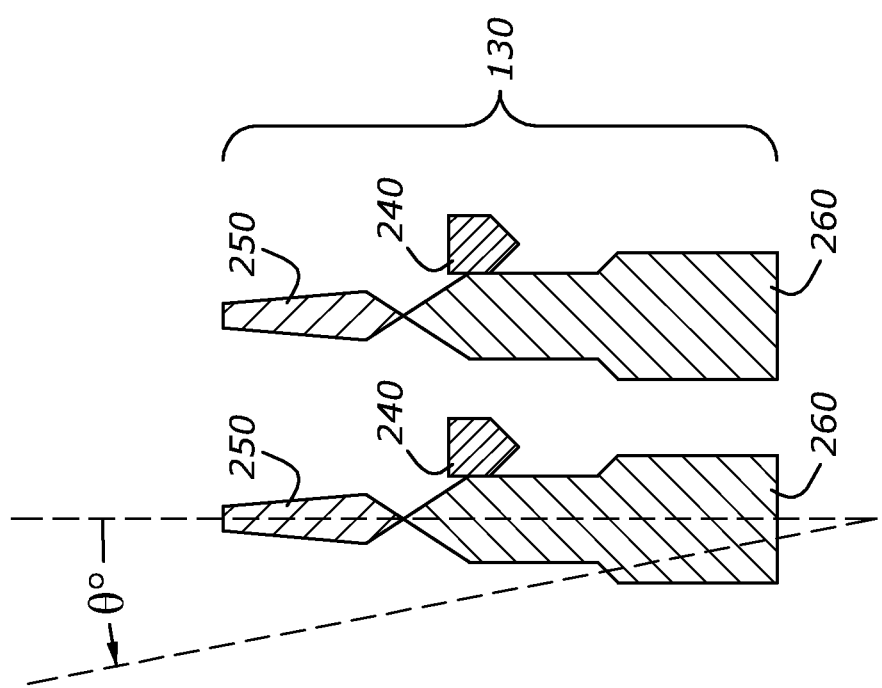
FIG. 2 is a side view of the transmission synchronizer of FIG. 1 in a misaligned condition.

In some instances where synchronization is desired, two engaging surfaces of the synchronizer assembly 130 can be misaligned, as represented in FIG. 2. Shown therein are the teeth on the clutch body 250 in which the shift fork 180 (as shown in FIG. 1) applies an engagement force. Teeth 250 are configured to engage the blocker 240 and mating teeth 260 on the input side 140 of the synchronizer assembly (as illustrated in FIG. 1). As shown in FIG. 2, the teeth 250 on the clutch body are misaligned with teeth 260 on the input side of the synchronizer assembly by an angle of θ, as shown in FIG. 2. In most instances, θ is an angle of a very small magnitude somewhere to the order of one or two degrees.

The present teachings include a unique method of detecting misalignment between the teeth of clutch body 190 and input side 140 of the synchronizer, as shown in FIG. 1. As power is supplied to the shift fork 180 either directly or indirectly (e.g., through a clutch drum 230 as shown in FIG. 1), the control module (e.g., 70) is configured to monitor the distribution of power to shift fork 180 when synchronization is desired.

Figure 3:
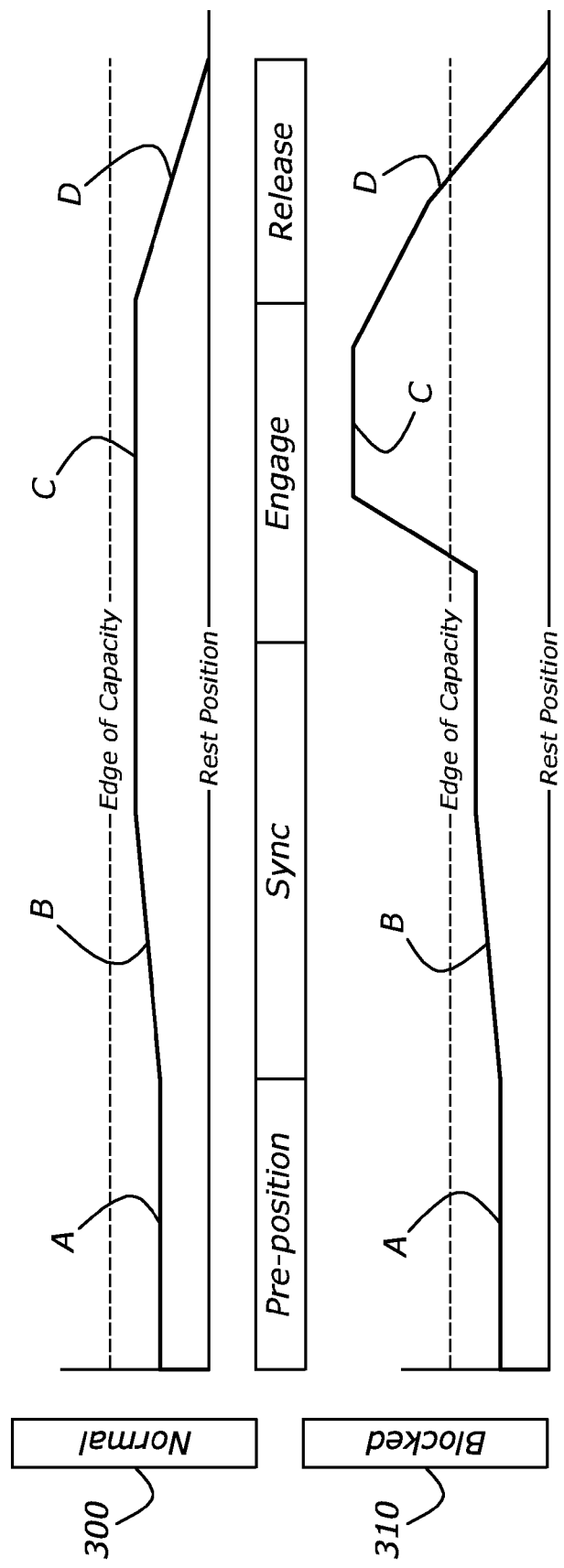
FIG. 3 illustrates two graphs of a monitored performance characteristic for a synchronizer power source in a normal and blocked condition.

As illustrated in FIG. 3, there is shown two graphs 300 and 310 characterizing a monitored performance characteristic for a power source in a "normal" and "blocked" condition. The first graph 300 is representative of monitored data taken during a normal (or appropriately aligned synchronization). The monitored performance characteristic in this instance is electric current demanded by a motor—e.g., power source 220 as shown in FIG. 1—configured to apply the shift fork 180. The motor is configured to demand enough power to effectuate synchronization. Where more power is required to engage synchronizer components motor sends a signal to the control module (e.g., 70) which accordingly regulates the power supplied to the motor. Control module 70 can be linked to a current logger or voltage meter, for example, between a battery and the motor. The graph 300 plots the electric current supplied to the motor over time. For example, power is supplied to the power motor which is connected to a mechanical linkage (not show) to apply the clutch drum 230 and move the shift fork 180.

The synchronization process (as shown in FIG. 3) occurs in at least four stages which are distinctively detectable through monitoring current distribution to or power demanded by the motor. During a first stage (A) the shift fork is in a pre-position or approach stage. The current supplied is below a predetermined threshold and is maintained at a consistent level over time. In the next stage, synchronization is initiated—stage (B). Current is increased and approaches the predetermined threshold but does not exceed the limit. When the teeth are appropriately aligned the current plateaus at the power level required to engage the clutch drum and the input side of the synchronizer (e.g., 25 amps). In an aligned synchronization, the gears successfully engage, at stage (C). The predetermined threshold or "edge of capacity" is approximately 30 amps. The current supplied is maintained at a level below the predetermined threshold. The threshold is set to roughly 130% of the power level necessary to engage the synchronizer components when aligned. In the final stage, stage (D), the clutch body and input side of the transmission are released and the current demanded by the power source tapers off to zero.

The next graph 310, illustrated in FIG. 3, is representative of monitored data taken during a blocked (or misaligned synchronization attempt). Graph also plots electric current supplied to or demanded by a motor over time. The attempted synchronization process occurs in at least four stages which are distinctively detectable through monitoring current distribution to the motor. During a first stage (A) the shift fork is in a pre-position or approach stage, similar to the graph shown with an aligned synchronization (e.g., 300). The current supplied is below a predetermined threshold and is maintained at a consistent level over time. In the next stage, synchronization is initiated stage (B). Current is increased and approaches the predetermined threshold but does not yet exceed the limit. When the teeth are inappropriately aligned (or misaligned, as shown in FIG. 2) the current spikes, exceeding the predetermined threshold. In a misaligned synchronization attempt, the gears fail to intermesh and the power distribution escalates substantially beyond the edge of capacity as shown at stage (C). In the final stage, stage (D), the clutch body and input side of the transmission are released and the current demanded by the power source tapers off to zero. The process is repeated in conventional systems which do not share the benefits of some of the present teachings. Accordingly, misalignment of the synchronization components can be detected through the monitoring of an electric current demanded by a power source.

In another embodiment, a misalignment is detected based on the performance characteristic not achieving a predetermined threshold. For example, as comparatively illustrated in FIG. 3, in the misalignment (or a "blocked" condition) graph 310 the current exceeds a predetermined threshold at various points in time throughout stage (C). If the current demanded has not achieved or fallen below the predetermined threshold by a given time, e.g., the end of stage (C), a misalignment can also be determined.

In another exemplary embodiment, misalignment of the synchronization components can be detected through the monitoring of pressure supplied or demanded by a power source. The power source is a hydraulic pump. Pressure is monitored through a pressure sensor or gauge on the pump. Where the performance characteristic in this instance—pressure supplied—exceeds a predetermined threshold (e.g., 130% of the pressure required to synchronize components where appropriately aligned) a misalignment of the synchronization components is detected. Other embodiments can include monitoring of other performance characteristics of a given power source. For example, one embodiment detects misalignment through voltage readings monitored from the voltage supplied to an electric motor.

Figure 4:
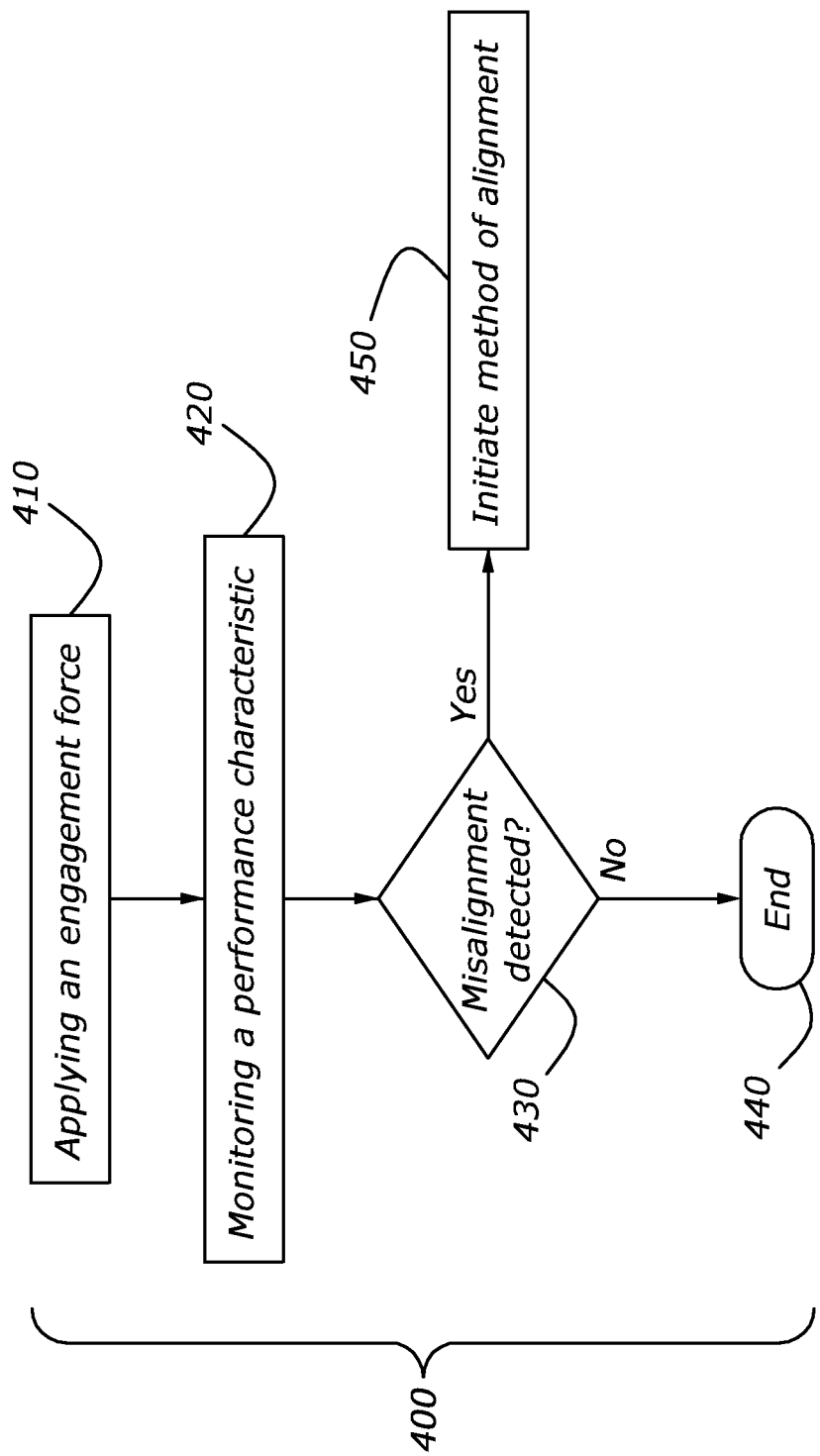
FIG. 4 is a flow chart illustrating a method of detecting misalignment in a vehicle transmission.

Referring now to FIG. 4, there is shown therein an exemplary method 400 of detecting synchronizer misalignment in a vehicle transmission. Method 400 can be executed by a control module using the exemplary statistics shown in FIG. 3 for a misalignment or blocked condition. The disclosed algorithm can be encoded into a processor circuit in the control module. The method 400 includes the step of applying an engagement force to an input side of a synchronizer or output side of the synchronizer 410. The engagement force can be applied through, for example, a clutch body 230 actuated by a shift fork 180, as discussed with respect to FIG. 1. The clutch body can apply the engagement force to the input and/or output side of the synchronizer.

The next step in the method 420 (shown in FIG. 4) is monitoring a performance characteristic of a power source configured to apply the engagement force. An exemplary performance characteristic is a current demanded by the power source as discussed with respect to FIG. 3. Step 430 involves determining a misalignment condition based on the performance characteristic exceeding or not achieving a predetermined threshold. As discussed in the exemplary embodiments shown herein, the performance characteristic of the power source can be an electric current demanded by the power source (e.g., an electric motor) or a pressure demanded by different power source (e.g., a hydraulic pump). If no misalignment is detected the program ends at step 440. Where misalignment is detected it can be cured using a method of alignment at step 450.

As shown in FIG. 5, a method 500 of aligning the transmission synchronizer includes the step of applying an engagement force to a clutch body on the synchronizer assembly 510. A shift fork can be utilized to supply the engagement force, as shown in FIG. 1. The application of the engagement force can be performed during a zero-speed condition for the transmission. In such instance the output side of the synchronizer (as shown in FIG. 1) would be not be rotating at all or might be rotating at an insignificant speed.

The next step 520, shown in FIG. 5, involves detecting misalignment between the clutch body and an input or output side of the synchronizer. Detecting misalignment 530 includes monitoring a performance characteristic of a power source configured to provide the engagement force. Where there is no misalignment detected the algorithm proceeds to step 530 where the engagement force is applied to the synchronizer until the components are engaged. Where a misalignment is detected the algorithm proceeds to step 540: applying a predetermined torque to the input or output side of the synchronizer to rotationally align the clutch body and input or output side of the synchronizer. The torque can be applied via the clutch pack by power source 220 (shown in FIG. 1). Power source 220 can be, for example, an electric motor or hydraulic pump. In another embodiment, a second power source, such a motor is utilized to apply a torque to the input side of the synchronizer. An exemplary predetermined torque may be less than 10 Nm. The predetermined torque can be of such magnitude so as to cause a rotation of the input or output side of the synchronizer less than two degrees—such as 5 Nm for example. The torque applied can be constant or adjusted. At step 550 the torque applied to the synchronizer is adjusted. The adjustment of the predetermined torque can include increasing or decreasing the torque at predetermined rate. In a preferred embodiment, the application of a predetermined torque is performed during tooth-on-tooth engagement (e.g., as shown in FIG. 2). In one embodiment of the method, the application of the engagement force is continuously performed until the input and output sides of the synchronizer are linked.

The embodiment of FIG. 5, includes a timer and the algorithm is configured to assess whether a predetermined time has expired at step 560. Where the time has expired, the method ends at step 570. The algorithm is intended to loop between the steps of re-checking for misalignment (at 580) and applying a torque to the synchronizer (at 540). If time has expired at step 560, the program ends at 570.

Referring now to FIG. 6, there is shown again the teeth 260 on the input side of a synchronizer with cured misalignment (as compared to FIG. 2) via an exemplary method of alignment. The teeth 260 on the input side of the synchronizer have been rotated by an angle of θ. Teeth 250 and 260 are aligned so as to engage the blocker 240 and mating teeth on the input side of the synchronizer assembly. In this instance, θ is an angle of approximately one or two degrees.

Figure 7:
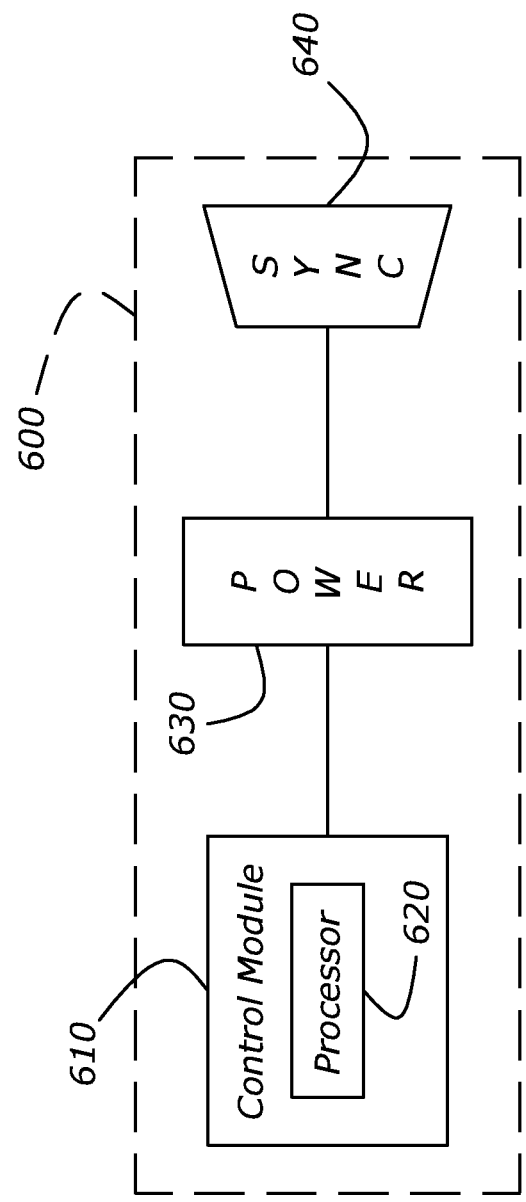
FIG. 7 is a schematic depiction of a control circuit for a vehicle transmission according to an exemplary embodiment of the present invention.

With reference now to FIG. 7, there is a control circuit 600 for a vehicle transmission shown therein. The control circuit 600 is configured to align misaligned components of a synchronizer assembly. The illustrated control circuit 600 includes a control module 610 configured to govern synchronization between an input shaft and output shaft. Within or linked to the control module 610 there is a processor circuit 620 configured to monitor a performance characteristic of a power source 630 and detect misalignment between synchronizer components—e.g., the clutch body 190 and input side of the synchronizer 140 (as shown in FIG. 2). The control module 610 is linked to a power source and configured to instruct the power source to rotate the input or output side of a synchronizer when a misalignment has been detected.

The control module processor circuit 620 is configured to instruct the power source 630 to apply a variable torque to the input or output side of a synchronizer 640. In the embodiments illustrated in FIGS. 1-6, a separate power source is used to apply an engagement force to the synchronizer 640 and rotate the input or output sides of the synchronizer to effectuate alignment. A separate or single power source, as shown in FIG. 7, can be included in a control circuit configured to employ the disclosed method. The processor circuit 620 is configured to detect alignment between the input and output side of the synchronizer and instruct the power source to stop applying torque when alignment is detected.

The control module 610, illustrated in FIG. 7, can be any sort of processor circuit or controller. Control module 610 can be separate or a part of the transmission control module (or TCU). Where control module 610 is separate from the TCU, communication can be established via hard-wire or wireless communication for any of the components in the control circuit. It should be appreciated that in a completely hydraulic system control circuit can be a hydraulic control circuit.

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A method of detecting synchronizer misalignment in a vehicle transmission, comprising:
    applying an engagement force to an input side of a synchronizer or output side of the synchronizer;
    monitoring an electric current demand of a power source configured to apply the engagement force; and
    determining a misalignment based on the current demand exceeding a predetermined current threshold.

2. A method of detecting synchronizer misalignment in a vehicle transmission, comprising:
    applying an engagement force to an input side of a synchronizer or output side of the synchronizer;
    monitoring a pressure demand of a power source configured to apply the engagement force; and
    determining a misalignment based on the pressure demand exceeding or not achieving a predetermined pressure threshold.

* * * * *